(12) United States Patent
Koponen et al.

(10) Patent No.: US 7,457,305 B2
(45) Date of Patent: Nov. 25, 2008

(54) HANDLING OF ACKNOWLEDGEMENT MESSAGES IN TERMINAL

(75) Inventors: Mari Koponen, Tampere (FI); Jukka Laurila, Nokia (FI)

(73) Assignee: Nokia Corporation, Espoo (FI)

( * ) Notice: Subject to any disclaimer, the term of this patent is extended or adjusted under 35 U.S.C. 154(b) by 670 days.

(21) Appl. No.: 11/045,762

(22) Filed: Jan. 27, 2005

(65) Prior Publication Data
US 2005/0163046 A1 Jul. 28, 2005

(30) Foreign Application Priority Data
Jan. 27, 2004 (FI) ................... 20040112

(51) Int. Cl.
*H04L 12/54* (2006.01)
*G08C 25/02* (2006.01)

(52) U.S. Cl. ...................... 370/428; 714/748
(58) Field of Classification Search ............... 370/229, 370/428, 242; 714/748, 749, 750
See application file for complete search history.

(56) References Cited

U.S. PATENT DOCUMENTS

| 6,367,045 | B1 * | 4/2002 | Khan et al. ............. | 714/748 |
| 6,557,135 | B1 * | 4/2003 | Balachandran et al. .... | 714/748 |
| 2003/0129969 | A1 | 7/2003 | Rucinski ................ | 455/412 |

FOREIGN PATENT DOCUMENTS

| WO | 0033502 | 6/2000 |
| WO | WO 00/33502 | 6/2000 |
| WO | 0062466 | 10/2000 |
| WO | WO 00/62466 | 10/2000 |

OTHER PUBLICATIONS

3rd Generation Partnership Project; 3GPP TS 04.60 V8.20.0 (Sep. 2003). ms-bss Interface; RLC/MAC protocol; pp. 246-249, Sep. 12, 2003.

* cited by examiner

*Primary Examiner*—Wing F Chan
*Assistant Examiner*—Matthew Campbell
(74) *Attorney, Agent, or Firm*—Ware, Fressola, Van Der Sluys & Adolphson

(57) ABSTRACT

The invention relates to handling of an acknowledgement message related to packet data transmission, said acknowledgement message acknowledging positively or negatively one or more data blocks sent from a terminal and said acknowledgement message comprising an information element related to the acknowledgement which element conditionally comprises a length field L, which indicates the length of the value part of said information element and possibly an uncompressed Ack/Nack bit map of varying length, which bit map length Lu may be calculated from the value of L with a predetermined calculation formula. In the method, one receives an acknowledgement message comprising said information element from a data transmission network and automatically ignores an uncompressed Ack/Nack bit map possibly included in the acknowledgement message, if said length field L is unspecified from the viewpoint of the terminal.

13 Claims, 4 Drawing Sheets

FIG.2A

| Lind | L | FAI | BOW | EOW | SSN | Cind | Lc | CBSCC | CRBB | URBB |
|---|---|---|---|---|---|---|---|---|---|---|
| 1 bit | 8 bits | 1 bit | 1 bit | 1 bit | 11 bits | 1 bit | 7 bits | 1 bit | Lc bits | L-Lc-23 bits |

FIG.2B

| Lind | L | FAI | BOW | EOW | SSN | Cind | URBB |
|---|---|---|---|---|---|---|---|
| 1 bit | 8 bits | 1 bit | 1 bit | 1 bit | 11 bits | 1 bit | L-15 bits |

FIG.2C

| Lind | FAI | BOW | EOW | SSN | Cind | URBB |
|---|---|---|---|---|---|---|
| 1 bit | 1 bit | 1 bit | 1 bit | 11 bits | 1 bit | L-15 bits |

HANDLING OF ACKNOWLEDGEMENT MESSAGES IN TERMINAL

TECHNICAL FIELD

The invention relates to wireless packet-data-based data transmission and handling of acknowledgement messages especially in an EGPRS (Enhanced GPRS, General Packet Radio Service) terminal.

BACKGROUND OF THE INVENTION

The GPRS (General Packet Radio Service) is a packet-switched data transmission service of a GSM (Global System for Mobile communications) network which service supplements existing services, such as traditional circuit-switched data transmission and short-message service. The EGPRS (Enhanced GPRS) is a more developed version of the GPRS, which utilizes the EDGE (Enhanced data rates for GSM Evolution) technology. The EDGE enables greater data transmission speeds compared to the normal GSM system.

On a general level, an EGPRS communications system comprises a backbone network of the EGPRS mobile station network and a radio access network ERAN (EDGE RAN, Radio Access Network), which is connected to the backbone network. The radio access network provides a terminal an access to the mobile station network via one or more base stations of the radio access network. There is an air interface (or a radio interface) between the radio access network and the terminal.

The backbone network is typically connected also to a fixed network in which case the mobile communications network may provide the terminal a connection to the services of the fixed network. The fixed network may be, for example, an IP (Internet Protocol) network, such as the Internet or an intranet network of a service provider (an intranet network which pertains to the operator domain). The connection may be done, for example, via a $G_i$ interface.

In the radio access network, a BSC (Base Station Controller) element is responsible for distributing radio resources to the terminal. A PCU (Packet Control Unit) element operates logically in connection with the BSC, which element controls in GPRS/EGPRS systems the functionality of packet-switched data transmission over a radio interface with a RLC (Radio Link Control) protocol layer. With the RLC layer, acknowledgement messages (ACK/NACK), inter alia, are sent by means of which one may ensure that all sent RLC data blocks are received at the receiving end.

On the RLC level, one has defined for EGPRS an EGPRS PACKET UPLINK ACK/NACK message for uplink, that is, occurring from the terminal to the direction of the network, data transmission which message is used for positive acknowledging (ACK) or negative acknowledging (NACK) of RLC data blocks sent by the terminal. With one acknowledgement message, one typically acknowledges several RLC data blocks. With a positive acknowledgement (ACK), the network informs the terminal that corresponding sent data blocks have been received successfully, and with a negative acknowledgement (NACK), the network informs the terminal that corresponding sent data blocks have not arrived, in which case the terminal should send again the data blocks in question. The EGPRS PACKET UPLINK ACK/NACK message has been defined in more detail in the 3GPP ($3^{rd}$ Generation Partnership Project) standard 3GPP TS 04.60 v 8.20.0 (2003 September).

In paragraph 12.3.1 of said standard 3GPP TS 04.60, an EGPRS Ack/Nack Description information element (IE) has been defined which element comprises RLC parameters which acknowledge positively or negatively a group of RLC data blocks. The information element is a group of information, which may be included in a signalling message or data stream, which is transmitted over a radio interface. The EGPRS Ack/Nack Description information element expresses by means of an Ack/Nack bit map and RLC data block sequence numbers (BSN) which RLC data blocks are acknowledged positively and which negatively. The information element may comprise a compressed and/or an uncompressed Ack/Nack bit map.

Now it has been noticed that the EGPRS standard does not specify unambiguously how the Ack/Nack Description information elements should be handled in a terminal, because then said information element does not comprise a length field L, that is, L is unspecified. The value of L is, however, used in calculating the length of an uncompressed bit map. Thus, calculating the length of the uncompressed bit map may lead to an unspecified mode in the terminal. In a possible implementation, the terminal may assume that L=0, that is, if the acknowledgement message has no L field. The specifications related to the terminal do not indicate how the terminal should handle those acknowledgement messages in which L=0. (The terminal specifications assume that L=15-255.) In principle, the terminal may handle the messages, in which L=0, in a normal manner. Then a calculation formula for calculating a length of an uncompressed Ack/Nack bit map Lu yields a negative figure, which may lead to an error mode in the terminal and thus, for example, to resetting the terminal. Alternatively, the terminal may reject such acknowledgement messages altogether, which may lead to stalling of uplink data transmission if the transmission window is filled and the terminal does not receive any acknowledgements from the network.

In addition, although the values of L<15 are, in principle, invalid values according to the standard, it is possible that a network implementation leads to using these values. This naturally leads to problems such as presented above.

SUMMARY OF THE INVENTION

An object of the invention is to accomplish a method, which solves these problems or at least alleviates them.

A basic idea of the invention is to ignore the uncompressed Ack/Nack bit map possibly included in the acknowledgement message, if length field L in the acknowledgement message in question is unspecified from the viewpoint of the terminal.

According to an embodiment of the invention, one may interpret a situation in which Lind=0 automatically so that the length of the uncompressed Ack/Nack bit map Lu=0, that is, the acknowledgement message has no uncompressed Ack/Nack bit map. In another embodiment of the invention, one may correspondingly interpret a situation, in which the calculation formula of Lu would lead to a negative value of Lu, automatically so that the acknowledgement message has no uncompressed Ack/Nack bit map. In other words, the terminal is controlled to totally ignore the uncompressed Ack/Nack bit map, if L<15 in the EGPRS Ack/Nack Description information element. Then, there is no need to calculate the value of Lu. Correspondingly, the uncompressed Ack/Nack bit map may be totally ignored, if the calculation formula of Lu leads to a negative value even if the value of L were greater than or equal to 15. The terminal may be controlled to handle the compressed Ack/Nack bit map in a normal manner if it is included in the EGPRS Ack/Nack Description information element in question, and otherwise to observe only the SSN field from the information element and to consider automatically the RLC data blocks for which BSN>SSN−1 negatively acknowledged.

According to a first aspect of the invention, a method is implemented for handling of an acknowledgement message related to packet data transmission in a terminal, said acknowledgement message acknowledging positively or negatively one or more data blocks sent from said terminal and said acknowledgement message comprising an information element related to the acknowledgement which element conditionally comprises a length field L, which indicates the length of the value part of said information element, and possibly an uncompressed Ack/Nack bit map of varying length, which bit map length Lu may be calculated from the value of L with a predetermined calculation formula, the method comprising receiving an acknowledgement message comprising said information element from a data transmission network into which said terminal is connected, and automatically ignoring an uncompressed Ack/Nack bit map possibly included in said information element, if said length field L is unspecified from the viewpoint of the terminal.

As described above, the length field L may be considered unspecified from the viewpoint of the terminal, for example, when the acknowledgement message does not comprise a length field L at all, when L<15 and/or when said calculation formula yields from the value of L a negative value for the uncompressed Ack/Nack bit map length Lu.

According to a second aspect of the invention, there is implemented a terminal, which is configured to be in a wireless, packet-data-based data transmission communication with a data transmission network, which terminal comprises sending equipment for sending data blocks to the data transmission network, receiving equipment for receiving an acknowledgement message from the data transmission network, said acknowledgement message acknowledging positively or negatively one or more data blocks sent from said terminal and said acknowledgement message comprising an information element related to the acknowledgement, which element conditionally comprises a length field L, which indicates the length of the value part of said information element, and possibly an uncompressed Ack/Nack bit map of varying length, which bit map length Lu may be calculated from the value of L with a predetermined calculation formula, and handling equipment for handling of an acknowledgement message comprising said information element, wherein said handling equipment is configured to automatically ignore an uncompressed Ack/Nack bit map possibly included in said information element, if said length field L is unspecified from the viewpoint of the terminal.

A terminal according to the invention may be any device, which may communicate with a packet-switched network, such as an EGPRS network, over a wireless transmission path. Such a device may be, for example, a mobile station, a laptop computer, a palm device, a smart phone or other electronic device, which is equipped with a communications module or similar. The communications module in question may be a part integrated into said device or the device may communicate functionally with a separate communications module.

According to a third aspect of the invention, there is implemented a data transmission system, which comprises at least one terminal and at least one network element, which terminal and network element are arranged to communicate with each other over a wireless, packet-data-based data transmission connection, said terminal comprising sending equipment for sending data blocks to the data transmission network, said network element comprising receiving equipment for sending an acknowledgement message to said terminal, said acknowledgement message acknowledging positively or negatively one or more data blocks sent from said terminal and said acknowledgement message comprising an information element related to the acknowledgement, which element conditionally comprises a length field L, which indicates the length of the value part of said information element, and possibly an uncompressed Ack/Nack bit map of varying length, which bit map length Lu may be calculated from the value of L with a predetermined calculation formula, and said terminal further comprising receiving equipment for receiving an acknowledgement message comprising said information element, and handling equipment for handling of an acknowledgement message comprising said information element, wherein said handling equipment in said terminal is configured to automatically ignore the uncompressed Ack/Nack bit map possibly included in the acknowledgement message received from the data transmission network, if said length field L is unspecified from the viewpoint of the terminal.

According to a fourth aspect of the invention, there is implemented a computer program, which provides a routine for handling of an acknowledgement message related to packet data transmission in a terminal, said acknowledgement message acknowledging positively or negatively one or more data blocks sent from said terminal and said acknowledgement message comprising an information element related to the acknowledgement which element conditionally comprises a length field L, which indicates the length of the value part of said information element and possibly an uncompressed Ack/Nack bit map of varying length, which uncompressed Ack/Nack bit map length Lu may be calculated from the value of L with a predetermined calculation formula, which computer program controls the terminal to automatically ignore an uncompressed Ack/Nack bit map possibly included in said information element of the acknowledgement message received from the data transmission network, if said length field L is unspecified from the viewpoint of the terminal.

Further embodiments of the invention are described below. It should be realized that the contents of the various embodiments that may be related to one aspect of the invention may also be applied to the other aspects of the invention.

By means of the invention, the terminal may be controlled to handle EGPRS Ack/Nack Description information elements (EGPRS UPLINK ACK/NACK messages) in a valid manner in situations which have earlier been unspecified. According to an embodiment of the invention, it is, inter alia, possible to be spared from unnecessary, unsafe and unspecified handling of Ack/Nack bit maps. Thus, one is able to improve possibilities to offer stable data transmission, even though there might be problems or abnormal activity on the side of the network.

BRIEF DESCRIPTION OF THE DRAWINGS

The invention will now be described in detail by way of examples with reference to the accompanying figures, in which

FIG. 2A shows an EGPRS Ack/Nack Description information element, which comprises a compressed and an uncompressed Ack/Nack bit map;

FIG. 2B shows an EGPRS Ack/Nack Description information element, which does not comprise a compressed Ack/Nack bit map;

FIG. 2C shows an EGPRS Ack/Nack Description information element, which does not comprise an L field;

DETAILED DESCRIPTION OF THE INVENTION

For the sake of clarity, the invention will next be described especially by means of the EGPRS technology, though without limiting the invention only to this technology. The invention is applicable to be utilized with any wireless, packet-data-based data transmission technology, wherein acknowledgement messages are sent to terminals connected to a data transmission network from the network as a response to data blocks sent by the terminals, the acknowledgement message in question comprising conditionally a length field L, which indicates the length of the value part of the information element related to the acknowledgement, and possibly an uncompressed Ack/Nack bit map of varying length, which bit map length Lu may be calculated from the value of L with a predetermined calculation formula, and/or a compressed Ack/Nack bit map of varying length.

Figure 1:
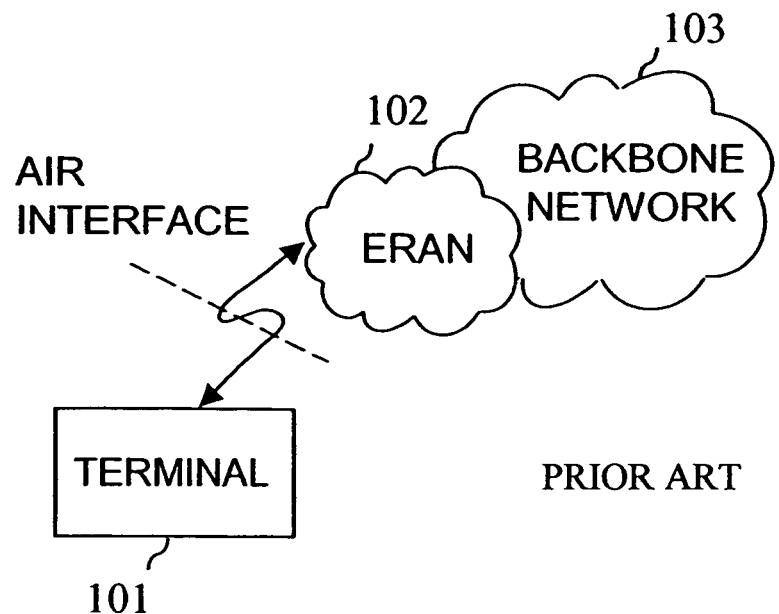
FIG. 1 shows an EGPRS communications system on a general level.

FIG. 1 shows, on a general level, an EGPRS communications system known from prior art. The system comprises a backbone network 103 of the EGPRS mobile station network and a radio access network ERAN (EDGE RAN, Radio Access Network) 102, which is connected to the backbone network 103. The radio access network 102 provides a terminal 101 an access to the mobile station network via one or more base stations (not shown) of the radio access network. There is an air interface (or a radio interface) between the radio access network 102 and the terminal 101.

The backbone network 103 is typically connected also to a fixed network (not shown) in which case the mobile communications network may provide the terminal a connection to the services of the fixed network. The fixed network may be, for example, an IP (Internet Protocol) network, such as the Internet or an intranet network of a service provider (an intranet network which pertains to the operator domain). The connection may be done, for example, via a $G_i$ interface.

In the radio access network 102, a BSC (Base Station Controller) element is responsible for distributing radio resources to the terminal. A PCU (Packet Control Unit) element operates logically in connection with the BSC, which element controls in GPRS/EGPRS systems the functionality of packet-switched data transmission over a radio interface with a RLC (Radio Link Control) protocol layer. With the RLC layer, acknowledgement messages (ACK/NACK), inter alia, are sent by means of which one may ensure that all sent RLC data blocks are received at the receiving end.

On the RLC level, one has defined for EGPRS an EGPRS PACKET UPLINK ACK/NACK message for uplink, that is, occurring from the terminal to the direction of the network, data transmission which message is used for positive acknowledging (ACK) or negative acknowledging (NACK) of RLC data blocks sent by the terminal. With one acknowledgement message, one typically acknowledges several RLC data blocks. With a positive acknowledgement (ACK), the network informs the terminal that corresponding sent data blocks have been received successfully, and with a negative acknowledgement (NACK), the network informs the terminal that corresponding sent data blocks have not arrived, in which case the terminal should send again the data blocks in question.

An EGPRS Ack/Nack Description information element (IE) comprises RLC parameters which acknowledge positively or negatively a group of RLC data blocks. The information element is a group of information, which may be included in a signalling message or data stream, which is transmitted over a radio interface. The EGPRS Ack/Nack Description information element expresses by means of an Ack/Nack bit map and RLC data block sequence numbers (BSN) which RLC data blocks are acknowledged positively and which negatively. The information element may comprise a compressed and/or an uncompressed Ack/Nack bit map. The fields of the EGPRS Ack/Nack Description information element are presented in FIGS. 2A and 2B.

FIG. 2A shows an EGPRS Ack/Nack Description information element, which comprises a compressed and an uncompressed Ack/Nack bit map. The different fields of the information element are briefly described in the following:

Lind (Length Ind, 1 bit) indicates if the information element includes a LENGTH field. If there is no LENGTH field, the information element fills the last part of the message in question.

L (LENGTH, 8 bits), which indicates the length of the value part of the information element. The standard defines the allowed range of variation of the LENGTH field as 15-255.

FAI (FINAL_ACK_INDICATION, 1 bit) indicates if the whole temporary block flow (TBF) is acknowledged positively. If the whole TBF is acknowledged positively, the following fields SSN, CRBB and URBB do not include information and they are ignored.

BOW (BEGINNING_OF_WINDOW, 1 bit) indicates if the Ack/Nack bit map starts from the beginning of the window.

EOW (END_OF_WINDOW, 1 bit) indicates if the Ack/Nack bit map comprises the end of the reception window.

SSN (STARTING_SEQUENCE_NUMBER, 11 bits) indicates the first RLC data block sequence number (BSN) of the Ack/Nack bit map.

Cind (Compressed BM Ind, 1 bit) indicates if the information element includes a compressed Ack/Nack bit map.

Lc (COMPRESSED_BITMAP_LENGTH, 7 bits) indicates the length of the compressed Ack/Nack bit map.

CBSCC (COMPRESSED_BITMAP_STARTING_COLOR_CODE, 1 bit) indicates how the compressed Ack/Nack bit map is interpreted.

CRBB (COMPRESSED_RECEIVE_BLOCK_BITMAP, Lc bits) includes the compressed Ack/Nack bit map.

URBB (UNCOMPRESSED_RECEIVE_BLOCK_BITMAP, Lu bits) includes the uncompressed Ack/Nack bit map. The length Lu of URBB field is calculated with the formula Lu=L−Lc−23.

FIG. 2B shows an Ack/Nack Description information element, which does not comprise a compressed Ack/Nack bit map. The information element is otherwise equivalent to the information element of FIG. 2A, but now the Cind field indicates that the information element does not comprise a compressed Ack/Nack bit map, in which case there are no Lc, CBSCC and CRBB fields, and the length Lu of URBB field is calculated with the formula Lu=L−15.

FIG. 2C shows an Ack/Nack Description information element in which Lind=0, that is, the information element fills the remainder of the RLC message in which the said information element exists. The information element is otherwise equivalent to the information element of FIG. 2B, which does not comprise a compressed Ack/Nack bit map, but now the Lind field indicates that the information element does not comprise an L field.

Figure 3:
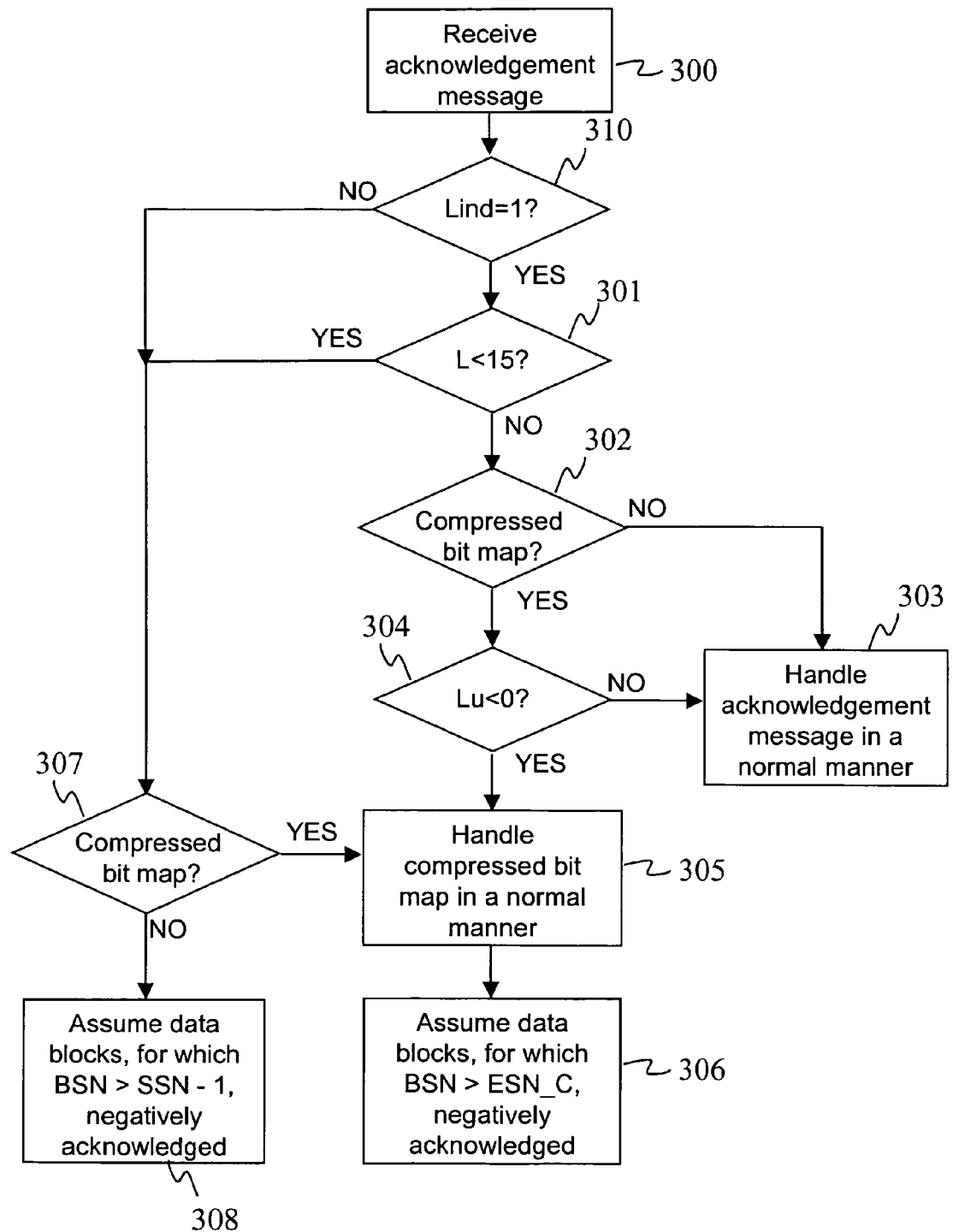
FIG. 3 is a flow diagram illustrating a method according to an embodiment of the invention.

FIG. 3 is a flow diagram illustrating a method according to an embodiment of the invention. In step 300, a terminal receives an acknowledgement message sent by the network, which message possibly comprises a length field L, which indicates the length of the value part of an information element related to the acknowledgement, a sequence number field SSN, which indicates the first data block sequence number BSN acknowledged in the acknowledgment message in question, and possibly a compressed Ack/Nack bit map of varying length and/or an uncompressed Ack/Nack bit map of varying length. If the acknowledgement message comprises a compressed Ack/Nack bit map, its length has been explicitly declared in the acknowledgement message. The length Lu of the uncompressed Ack/Nack bit map may be, for its part, calculated from the value of L with a predetermined calculation formula, which has been presented above in the context of prior art, if the acknowledgement message comprises a length field L.

In step 310, it is first checked if the acknowledgement message comprises a length field L. If the value of the Lind field is 1 in the information elements according to FIGS. 2A-2C, it includes a length field L. Then, one passes to step 301 to examine the value of L. If Lind=0, the acknowledgement message has no L field and the handling of the acknowledgement message is passed to step 307, which will be later introduced in detail.

In step 301, it is first checked if L<15 in the acknowledgement message in question. If L is greater than 15, one passes to step 302 in which it is checked if a compressed Ack/Nack bit map is included in the acknowledgement message. If there is no compressed Ack/Nack bit map, that is, if Cind=0 in the information elements according to FIGS. 2A-2C, the acknowledgement message will be handled in a normal manner in step 303. In this context, handling in a normal manner means handling according to the 3GPP standard TS 04.60.

If one detects in step 302 that a compressed Ack/Nack bit map is included in the acknowledgement message, that is, if Cind=1 in the information elements according to FIGS. 2A and 2B, one passes to step 304 in which it is checked if the above-mentioned calculation formula results in a negative value for the uncompressed Ack/Nack bit map length Lu. If the value of Lu is positive, one passes to step 305 and handles the acknowledgement message in a normal manner.

If one detects in step 304 that Lu is negative, the possible uncompressed Ack/Nack bit map included in the acknowledgement message is automatically ignored. In practice, the value of Lu is then assumed to be 0. However, the compressed Ack/Nack bit map observed in step 302 is handled in a normal manner in step 305. (Also here, handling in a normal manner means handling according to the 3GPP standard TS 04.60 v 8.20.0 (2003 September).) After this, the data blocks for which BNS>ESN_C, in which ESN_C is the sequence number of a data block last acknowledged in the compressed bit map, are assumed negatively acknowledged in step 306.

Here one must notice that a so-called "lifetime" is set for sent data blocks during which they cannot be acknowledged negatively. This prevents the just now sent data blocks to be set negatively acknowledged. Above, those data blocks for which BNS>ESN_C and the lifetime of which has expired are acknowledged negatively. (If the lifetime has not expired, the data block cannot be acknowledged negatively.)

If one detects in step 310 that there is no L field, or if one detects in step 301 that L is less than 15, the possible uncompressed Ack/Nack bit map included in the acknowledgement message is automatically ignored. In practice, the value of Lu may be assumed to be 0 without a need to calculate the length of Lu with the above-mentioned calculation formula, that is, here one is able to decrease calculation in the terminal. Then, the handling of the acknowledgement message continues in step 307 in which one checks if the acknowledgement message includes a compressed Ack/Nack bit map. If there is no compressed Ack/Nack bit map, that is, if Cind=0 in the information elements according to FIGS. 2A-2C, the data blocks for which BNS>SSN−1 are assumed negatively acknowledged in step 308. In other words, all data blocks, which are acknowledged in the message in question, are assumed negatively acknowledged. Also here, only those data blocks, whose lifetime of which has expired, are acknowledged negatively.

If one detects in step 307 that the acknowledgement message includes a compressed Ack/Nack bit map, one passes to step 305 and further to step 306 in which the compressed Ack/Nack bit map is handled in a normal manner and then the data blocks for which BNS>ESN_C are assumed negatively acknowledged as described above.

In this context, one should notice that if the FAI (FINAL_ACK_INDICATION) bit shown in FIGS. 2A-2C is set as one in the handled acknowledgement message, in current (R99) EGPRS implementations all the data blocks sent by the terminal are assumed positively acknowledged, and the data transmission communication between the terminal and the network is terminated. In other words, in this situation it is assumed that the SSN field and possible Ack/Nack bit maps do not contain information and they are ignored. The handling of an acknowledgement message according to the invention may, thus, become unnecessary if FAI=1 in the acknowledgement message.

However, in the EGPRS implementations according to REL4, the SSN field and possible Ack/Nack bit maps are not automatically ignored even though FAI=1. If the terminal receives an acknowledgement message in which FAI=1, all data blocks sent by the terminal are not automatically assumed positively acknowledged, but also the SSN field and possible Ack/Nack bit maps are read. If the bit map acknowledges some of the data blocks negatively, these are sent anew from the terminal, in which case FAI=1 does not directly lead to the termination of data transmission communication.

Furthermore, one should notice in this context that the acknowledgement message, to handling of which the invention is related, may comprise also other data in addition to the information element related to the data block acknowledgement. The acknowledgement message may be, for example, a general RLC-level control message which may comprise other information elements controlling radio link functions, such as reseginenting, or other data in addition to the information element related to acknowledgements.

Referring further to FIG. 3, one should understand that the presented flow diagram illustrates only one possible implementation and that the order of presented steps may be freely changed or only a part of the presented steps may be included in a practical implementation. For example, an implementation in which only steps 300, 310, 301, 303 and 308 are included is possible. Then, the data blocks for which BNS>SSN−1 are assumed negatively acknowledged if L<15 or if there is no L field, and otherwise the acknowledgement message is handled in a normal manner.

Figure 4:
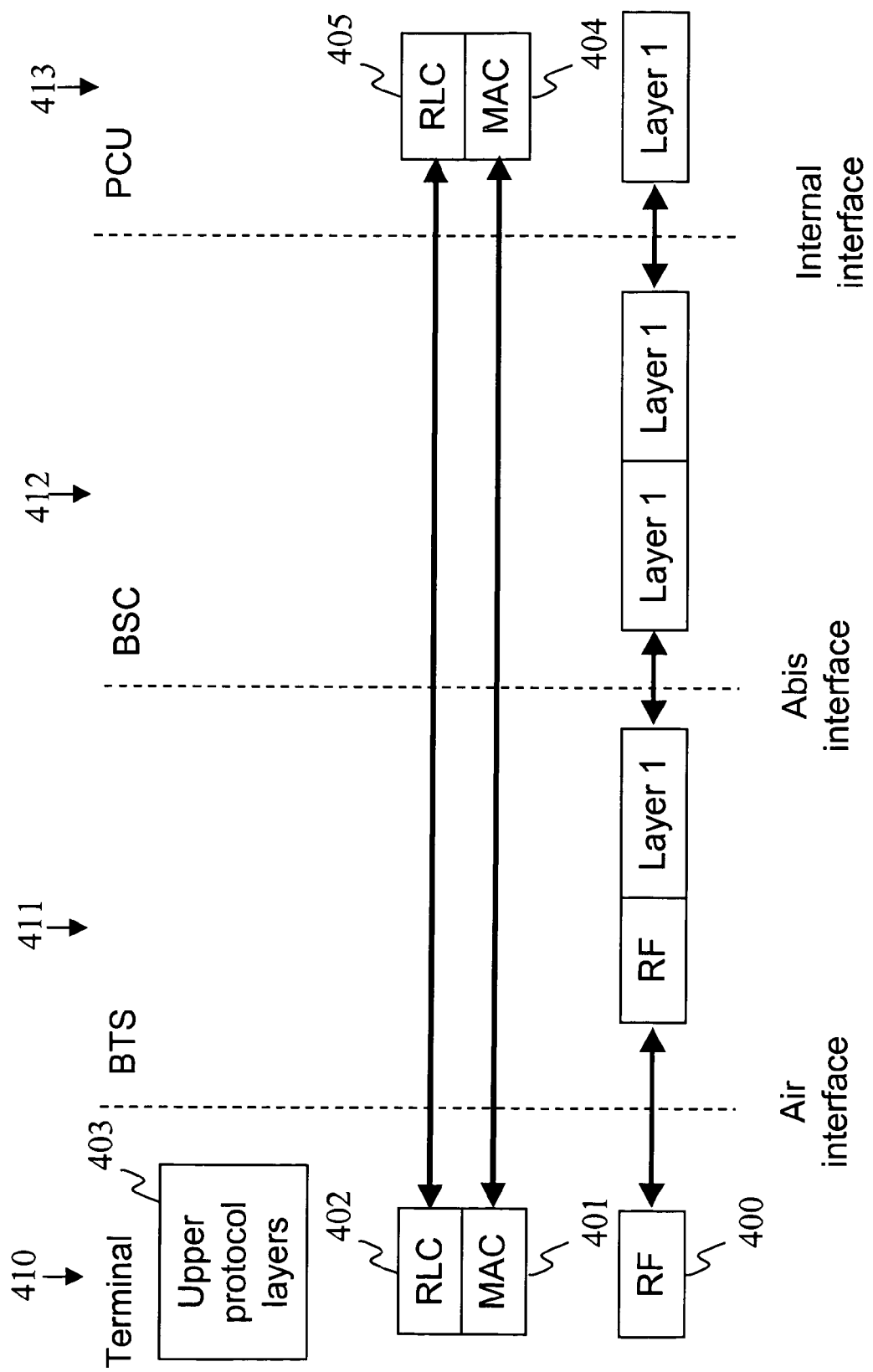
FIG. 4 shows, on protocol stack level, a system in which the invention may be applied.

FIG. 4 shows, on protocol stack level, a system in which the invention may be applied. The figure presents the most relevant protocol layers from the viewpoint of the invention in a terminal 410 and in some network elements of the EGPRS network.

The terminal 410 comprises a radio interface 400 (physical layer), a MAC (Medium Access Control) layer 401, an RLC (Radio Link Control) layer 402 and upper protocol layers 403. The upper protocol layers may be, inter alia, a TCP/IP (Transport Control Protocol/Internet Protocol) layer and application layers. Over an air interface, the terminal has a physical layer connection to a BTS (Base Transceiver Station) 411 of the radio access network, which BTS, in turn, has a physical layer (layer 1) (fixed) connection to a BSC (Base Station Controller) element 412 over an Abis interface. The BSC element further has a physical layer connection to a PCU (Packet Control Unit) element 413 operating logically in connection with the BSC. The PCU element may be an integrated part of the BSC element or it may be located in another suitable network component.

The PCU element 413 comprises the MAC and RLC protocol layers 404 and 405 and it has a MAC and RLC level connection to the terminal. The PCU element controls in the EGPRS system the functionality of packet-switched data transmission over the radio interface with the RLC protocol layer. The method according to the invention is substantially implemented in the RLC-level traffic between the terminal and the PCU element concerning especially the RLC-layer acknowledgement messages. An embodiment of the invention may be implemented, for example, so that the MAC layer in the terminal receives an acknowledgement message from the network, in which message Lind=0 and which thus does not include an L field. The MAC layer attaches an L field to the acknowledgement message before communicating the acknowledgement message to the RLC layer and sets the value of the L field as 0. In this way, the data transmission in the MAC-RLC interface may be kept in a standard form regardless of the form in which the acknowledgement messages are received from the network. The handling of the acknowledgement message with the RLC layer may, thus, be configured to assume that the length of the uncompressed Ack/Nack bit map Lu=0, that is, to ignore the uncompressed Ack/Nack bit map when Lind=0 and L=0 or when merely L=0. In the latter case, the RLC layer may handle the acknowledgement message without having to examine the Lind field.

The PCU element 413 is further in connection with an SGSN (Serving GPRS Support Node) element and via that to other components of the radio network and further to other networks (not shown).

Figure 5:
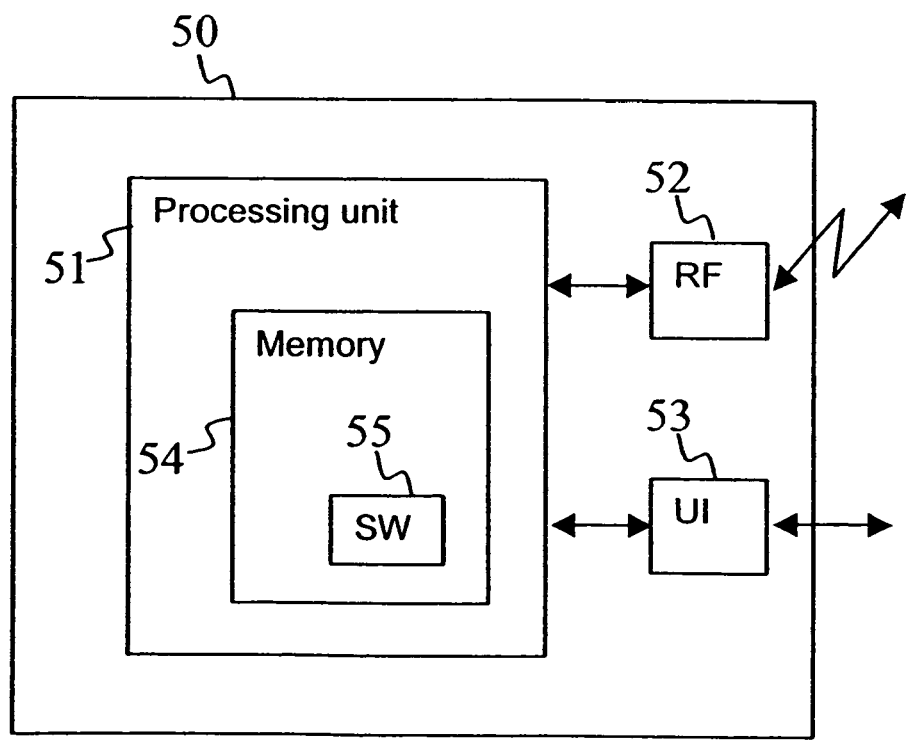
FIG. 5 shows a simplified block diagram of a device according to an embodiment of the invention.

FIG. 5 shows a simplified block diagram of a device 50 according to an embodiment of the invention, which device may be any device, which may be in packet-data-based data transmission communication with a data transmission network over a wireless transmission path, such as a mobile station, a laptop computer, a palm device, a smart phone or other electronic device.

The terminal 50 comprises a processing unit 51 and a radio frequency part (RF) 52 and a user interface (UI) 53 connected to the processing unit. The radio frequency part 52 provides an air interface for implementing data transmission over a wireless transmission path. The user interface may comprise, for example, a display and a keyboard and possibly another control device (not shown in the figure) by means of which the device in question may be used. The invention may also be utilized in devices which do not have an actual user interface.

The processing unit 51 comprises a processor (not shown in the figure), a memory 54 and a computer program 55 stored into the memory to be run in said processor. The processor controls, according to the computer program 55, the terminal to handle acknowledgement messages, which acknowledge positively or negatively one or more data blocks sent from said terminal. An acknowledgement message comprises an information element related to the acknowledgement, which element conditionally comprises a length field L, which indicates the length of the value part of the information element related to the acknowledgement, and possibly an uncompressed Ack/Nack bit map of varying length, the length of which may be calculated from the value of L with a predetermined calculation formula. When the terminal has received an acknowledgement message from the network, it is controlled to automatically ignore the uncompressed Ack/Nack bit map possibly included in the acknowledgement message, if said length field L is unspecified from the viewpoint of the terminal. Furthermore, the terminal 50 may be controlled to automatically ignore the uncompressed Ack/Nack bit map, if said information element does not include (310) a length field L, if L<15 in said acknowledgement message or if said calculation formula yields a negative value for the uncompressed Ack/Nack bit map length.

The invention was described above using the EGPRS technology as an example in illustrating the invention without limiting the invention to this example only. It will be realized by those skilled in the art that this invention may be utilized in context of any other applicable network technologies. The implementation and utilizing possibilities of the invention are limited solely by the appended patent claims. Thus the different implementation alternatives of the invention defined by the claims, also equivalent implementations, are within the scope of the invention.

The invention claimed is:

1. A method, comprising:
   receiving an acknowledgement message acknowledging positively or negatively one or more data blocks transmitted from a terminal, said acknowledgement message comprising an information element related to the acknowledgement,
   wherein said information element conditionally comprises a length field indicating a length of a value part of said information element and an uncompressed Ack/Nack bit map, if a value of said length field is less than 15 or the length field is not included in the information element from the viewpoint of the terminal, automatically ignoring the uncompressed Ack/Nack bit map,
   wherein a length of the uncompressed Ack/Nack bit map is calculated from the value of the length field according to a predetermined calculation formula.

2. The method according to claim 1, wherein said uncompressed Ack/Nack bit map is automatically ignored, if the length of the uncompressed Ack/Nack bit map calculated from the value of the length field according to said calculation formula is a negative value.

3. The method according to claim 1, wherein said information element further comprises a sequence number field whose value being a block sequence number of a first data block to be acknowledged, and wherein ignoring the uncompressed Ack/Nack bit map comprises:
   considering a data block negatively acknowledged, if said data block has a block sequence number greater than the value of the sequence number field minus 1, except for the data blocks which cannot yet be acknowledged negatively.

4. The method according to claim 1, wherein ignoring the uncompressed Ack/Nack bit map is performed by assuming that the length of the uncompressed Ack/Nack bit map is zero.

5. The method according to claim 4, wherein the length of the uncompressed Ack/Nack bit map is directly assumed to be zero, if said information element does not comprise the length field or if the value of the length field is less then 15.

6. The method according to claim 1, wherein said information element further comprises a compressed Ack/Nack bit map, and the compressed Ack/Nack bit map is handled in a normal manner.

7. The method according to claim 6, wherein data blocks are referred to with block sequence numbers, and ignoring the uncompressed Ack/Nack bit map is performed by
automatically considering a data block negatively acknowledged, if said data block has a block sequence number greater than a sequence number of a last data block acknowledged in the compressed bit map.

8. The method according to claim 1, wherein said terminal is an Enhanced General Packet Radio Service terminal.

9. An apparatus, comprising:
a transmitter configured to transmit data blocks to a data transmission network,
a receiver configured to receive an acknowledgement message from the data transmission network, said acknowledgement message acknowledging positively or negatively one or more data blocks sent from said terminal and said acknowledgement message comprising an information element related to the acknowledgement, and
a processing unit configured to handle the acknowledgement message,
wherein said information element conditionally comprises a length field indicating a length of a value part of said information element, and an uncompressed Ack/Nack bit map, if a value of said length field is less than 15 or the length field is not included in the information element from the viewpoint of the apparatus, said processing unit is configured to automatically ignore the uncompressed Ack/Nack bit map, and
wherein a length of the uncompressed Ack/Nack bit map is calculated from the value of the length field according to a predetermined calculation formula.

10. The apparatus according to claim 9, wherein said apparatus is a mobile station, a laptop computer, a palm device, a smart phone or some other electronic device, which is equipped with a communications module or similar.

11. A system, which comprises at least one terminal and at least one network element, said terminal and said network element being arranged to communicate with each other over a wireless, packet-data-based data transmission connection,
wherein said network element comprises:
a receiver configured to receive data blocks from the terminal, and
a transmitter configured to transmit an acknowledgement message to said terminal, said acknowledgement message acknowledging positively or negatively one or more data blocks received from said terminal and said acknowledgement message comprising an information element related to the acknowledgement,
wherein said terminal comprises:
a transmitter configured to transmit said data blocks to the network element,
a receiver configured to receive said acknowledgement message, and
a processing unit for handling the acknowledgement message,
wherein said information element conditionally comprises a length field indicating a length of a value part of said information element and an uncompressed Ack/Nack bit map, if a value of said length field is less than 15 or the length field is not included in the information element from the viewpoint of the terminal, said processing unit is configured to automatically ignore the uncompressed Ack/Nack bit map, and
wherein a length of the uncompressed Ack/Nack bit map is calculated from the value of the length field according to a predetermined calculation formula.

12. The system according to claim 11, wherein said network element is a packet control unit element or other corresponding network element, said network element controls said wireless, packet-data-based data transmission between said network element and said terminal.

13. A computer program product comprising a computer readable medium storing program codes thereon for use by the processing unit in a terminal device, wherein said program codes comprise:
instructions for receiving an acknowledgement message related to packet data transmission, said acknowledgement message acknowledging positively or negatively one or more data blocks sent from said terminal and said acknowledgement message comprising an information element related to the acknowledgement, and
instructions for handling the acknowledgement message,
wherein said information element conditionally comprises a length field indicating a length of a value part of said information element and an uncompressed Ack/Nack bit map, if a value of said length field is less than 15 or the length field is not included in the information element from the viewpoint of the terminal, the uncompressed Ack/Nack bit map is automatically ignored, and
wherein a length of the uncompressed Ack/Nack bit map is calculated from the value of the length field according to a predetermined calculation formula.

* * * * *